United States Patent
Fujiyoshi et al.

(10) Patent No.: US 8,908,116 B2
(45) Date of Patent: Dec. 9, 2014

(54) LIQUID CRYSTAL DISPLAY DEVICE

(75) Inventors: Jun Fujiyoshi, Mobara (JP); Yasukazu Kimura, Chiba (JP); Hideo Tanabe, Mobara (JP); Masataka Okamoto, Chonan (JP); Hidekazu Miyake, Mobara (JP)

(73) Assignees: Japan Display Inc., Tokyo (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 246 days.

(21) Appl. No.: 13/277,262

(22) Filed: Oct. 20, 2011

(65) Prior Publication Data
US 2012/0105778 A1     May 3, 2012

(30) Foreign Application Priority Data
Oct. 29, 2010   (JP) .................. 2010-242986

(51) Int. Cl.
- G02F 1/136 (2006.01)
- G02F 1/1335 (2006.01)
- G02F 1/1343 (2006.01)
- G02F 1/1362 (2006.01)

(52) U.S. Cl.
CPC .... G02F 1/134363 (2013.01); G02F 1/136227 (2013.01)
USPC ............... 349/43; 349/42; 349/106; 349/141; 438/30; 438/43

(58) Field of Classification Search
USPC .......... 349/42, 43, 106, 130, 141; 438/30, 42, 438/43
See application file for complete search history.

(56) References Cited

U.S. PATENT DOCUMENTS

| | | | | |
|---|---|---|---|---|
| 5,568,293 | A | * | 10/1996 | Takao et al. .................... 349/106 |
| 5,943,105 | A | * | 8/1999 | Fujikawa et al. ................ 349/39 |
| 2004/0125277 | A1 | * | 7/2004 | Kim et al. ...................... 349/106 |
| 2010/0009295 | A1 | * | 1/2010 | Um et al. ....................... 430/319 |
| 2010/0227425 | A1 | * | 9/2010 | Tanabe et al. ................... 438/30 |

FOREIGN PATENT DOCUMENTS

JP       2008-64954       3/2008

* cited by examiner

*Primary Examiner* — Michael Caley
(74) *Attorney, Agent, or Firm* — Antonelli, Terry, Stout & Kraus, LLP.

(57) ABSTRACT

A liquid crystal display device includes a first substrate and a second substrate with a liquid crystal layer therebetween. The first substrate includes drain lines, gate lines, thin-film transistors that output signals to pixel electrodes, and an organic film that is formed between each thin-film transistor and each pixel electrode. The organic film has a contact hole for electrical connection between a source electrode of each thin-film transistor and each pixel electrode. A step is formed in a layer underlying the organic film and an edge portion of the organic film toward the thin-film transistor, the edge portion forming the contact hole, being formed to lie on a lower plane of the step. A sidewall part of the contact hole which is formed in the organic film is formed to have a taper angle of at least 60 degrees.

14 Claims, 9 Drawing Sheets

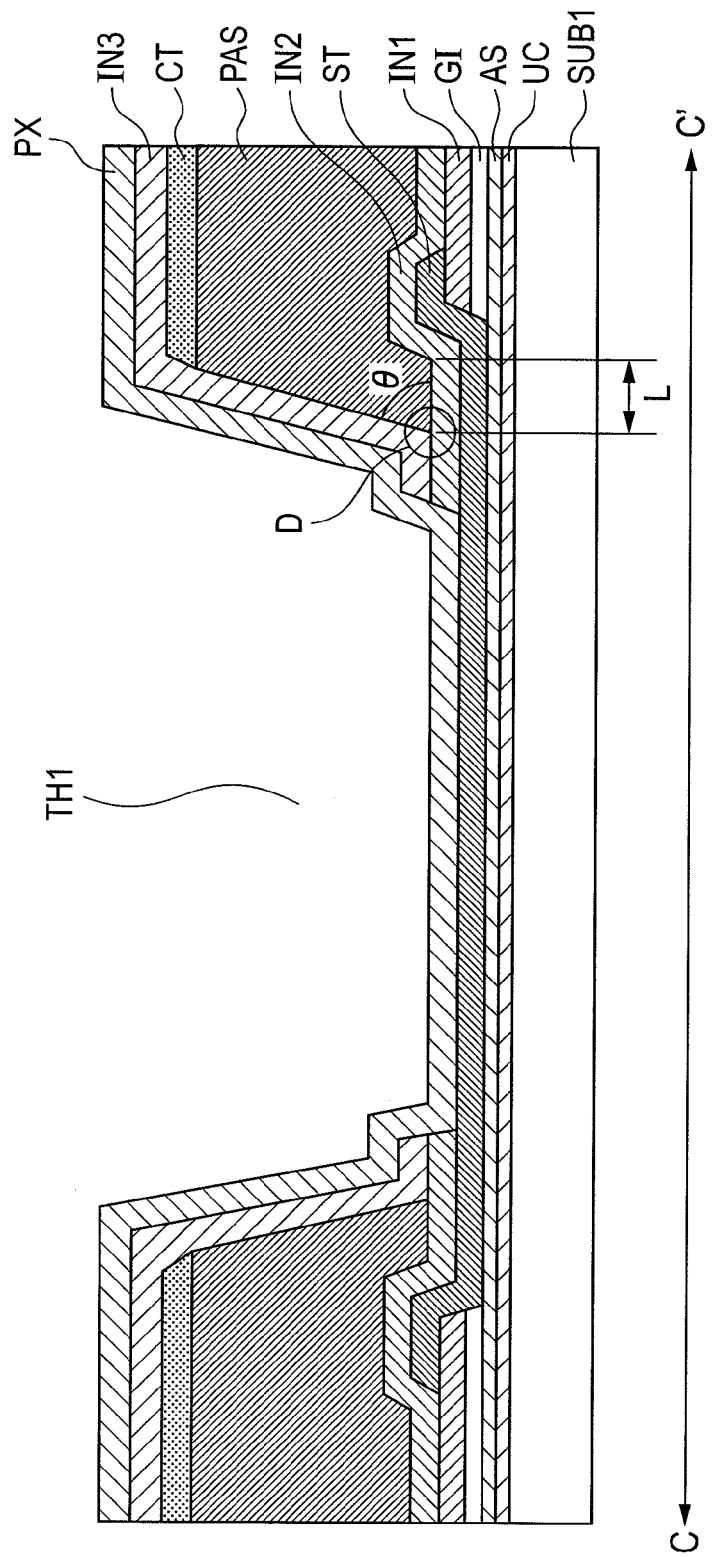

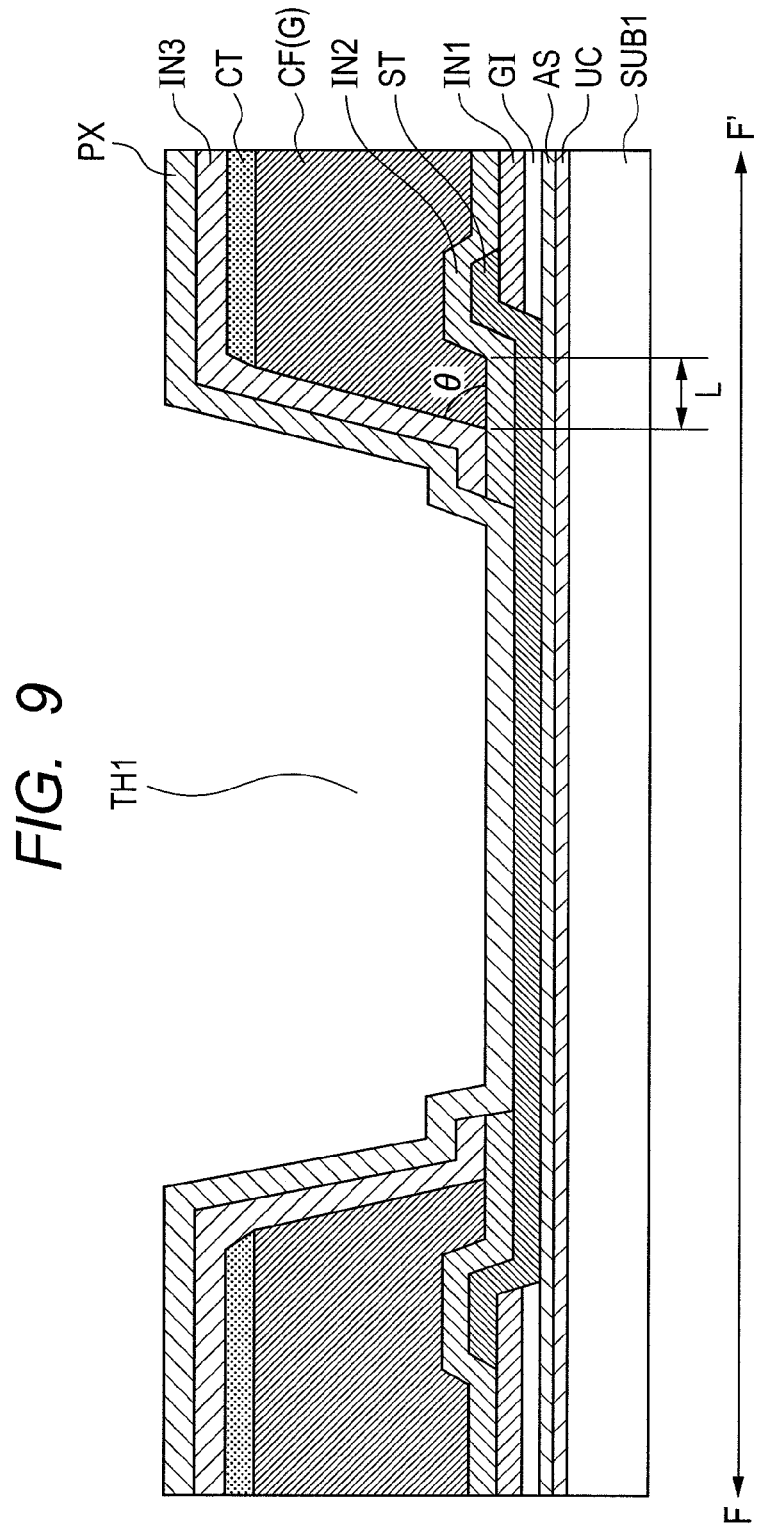

LIQUID CRYSTAL DISPLAY DEVICE

CLAIM OF PRIORITY

The present application claims priority from Japanese Patent Application JP 2010-242986 filed on Oct. 29, 2010, the content of which is hereby incorporated by reference into this application.

FIELD OF THE INVENTION

The present invention relates to a liquid crystal display device and particularly to a technique for forming a tapered opening in a film formed over a substrate. The present invention relates to a technique that is applicable, for example, when forming a contact hole for electrical connection between a source electrode of a thin-film transistor and a pixel electrode, as such technique for forming a tapered opening in the film in which the contact hole is formed.

BACKGROUND OF THE INVENTION

A liquid crystal display device is configured with a pair of substrates that are disposed to be opposed to each other with a liquid crystal layer sandwiched between the substrates. Over a surface, facing toward the liquid crystal layer, of a first substrate of the pair of substrates, gate lines extending in an X direction and evenly spaced and arranged in a Y direction and drain lines extending in the Y direction and evenly spaced and arranged in the X direction are formed. A rectangular area surrounded by these lines is defined as a pixel area. A display region is formed by a collection of all these pixels.

Each pixel includes a thin-film transistor that is turned on by a scan signal from a gate line and a pixel electrode to which a visual signal is supplied from a drain line via a source electrode of the turned on thin-film transistor.

In such liquid crystal display device, an inorganic insulation film is formed over the surface of each thin-film transistor, thus covering the surface, facing toward the liquid crystal layer, of the first substrate including the thin-film transistors. An organic insulation film serving as a planarizing film is formed over this inorganic insulation film surface toward the liquid crystal layer. Over the organic insulation film surface toward the liquid crystal layer, pixel electrodes are disposed and a pad extending from the source electrode of a thin-film transistor and a part of a pixel electrode are formed in an overlap location. In this overlap region, a contact hole is formed which penetrates through the organic and inorganic insulation films and extends to the pad for electrical connection between the pixel electrode and the source electrode.

Meanwhile, as the scope of application to liquid crystal display devices has expanded lately, even higher image quality and definition are demanded. To realize higher definition, it is needed to increase the aperture ratio of a liquid crystal display panel, in other words, the aperture ratio of each pixel. As a liquid crystal display device with an increased aperture ratio, it is conceivable to form a film that forms the contact hole for electrical connection between the pad and the pixel electrode with a large taper angle, reduce the area occupied by the contact hole in a pixel area, and increase the aperture ratio.

A liquid crystal display device in which the contact hole with a large taper angle is formed is, for example, a liquid crystal display device described in Japanese Published Unexamined Patent Application No. 2008-64954. According to a technique described in Japanese Published Unexamined Patent Application No. 2008-64954, a pad is formed in a layer overlying an interlayer dielectric film and a contact hole with a taper angle of 60 degrees is formed in an organic insulation film which is formed to cover the pad. By this configuration, a pixel electrode that is formed on the surface of the organic insulation film and the pad are electrically connected.

However, it is known that, when an organic insulation film having a contact hole is formed, particularly when an organic insulation film having a contact hole is formed with a negative-type organic material, the forming process requires exposure time that is two or three times as much as the exposure time forming other inorganic insulation films. Especially, to form an organic insulation film having a contact hole with a taper angle of 60 degrees, as described in Japanese Published Unexamined Patent Application No. 2008-64954, a still larger amount of exposure is required. Therefore, it is feared that throughput of liquid crystal display device production may be significantly decreased due to increased time required for production. In addition, use of some material (resist material) of organic insulation film makes it impossible to form a contact hole with a taper angle of more than 60 degrees.

SUMMARY OF THE INVENTION

An object of the present invention contrived in view of these problems is to provide a technique that enables forming an organic insulation film having a contact hole tapered at a larger taper angle without increasing the amount of exposure.

In order to solve the above problems, a liquid crystal display device according to one aspect of the present includes a first substrate and a second substrate which is disposed to be opposed to the first substrate across a liquid crystal layer, the first substrate including drain lines extending in a Y direction and evenly spaced and arranged in an X direction; gate lines extending in the X direction and evenly spaced and arranged in the Y direction; thin-film transistors that output visual signals from the drain lines to pixel electrodes in sync with scan signals from the gate lines; and an organic film that is formed between each of the thin-film transistors and each of the pixel electrodes. In the liquid crystal display device, the organic film has a contact hole for electrical connection between a source electrode of each thin-film transistor and each pixel electrode, a step is formed in a layer underlying the organic film and an edge portion of the organic film toward the thin-film transistor, the edge portion forming the contact hole, is formed to lie on a lower plane of the step, and a sidewall part of the contact hole which is formed in the organic film is formed to have a taper angle of 60 degrees or larger.

Another aspect of the present invention resides in a liquid crystal display device including a plurality of pixels, each including a thin-film transistor and a pixel electrode, and an organic insulation film formed between one electrode of the thin-film transistor and the pixel electrode. The one electrode and the pixel electrode are connected through a contact hole formed in the organic insulation film. A sidewall of the contact hole, which is made of the organic insulation film, is tapered. An underlying layer beneath the organic insulation film, in contact with the organic insulation film, includes a first plane that overlaps with the sidewall in a planar view and a second plane that is situated nearer the pixel electrode in relation to the first plane and a step is formed by the first plane and the second plane. A distance from a position at which the sidewall intersects with the first plane to an end, abutting on the second plane, of the first plane is equal to or less than 1 μm.

A further aspect of the present invention resides in a liquid crystal display device including a pair of substrates that is dispose to be opposed to each other; a plurality of pixels, each including a thin-film transistor and a pixel electrode, formed over one of the pair of substrates; a color filter layer including a first color filter, a second color filter, and a third color filter formed between the thin-film transistor and the pixel electrode and formed adjacent to each other. One electrode of the thin-film transistor and the pixel electrode are connected through a contact hole formed in the color filter layer. A sidewall of the contact hole, which is made of the color filter layer, is tapered. An underlying layer beneath the color filter layer, in contact with the color filter layer, includes a first plane that overlaps with the sidewall in a planar view and a second plane that is situated nearer the pixel electrode in relation to the first plane and a first step is formed by the first plane and the second plane. A distance from a position at which the sidewall intersects with the first plane to an end, abutting on the second plane, of the first plane is equal to or less than 1 μm. The first color filter, the second color filter, and the third color filter are formed such that an end face of the second color filter is superposed over one end face of the first color filter and an end face of the third color filter is superposed over the other end face, which is different from the one end face, of the first color filter. The one end face and the other end face of the first color filter are tapered. A region of the underlying layer, in contact with the first color filter, includes a third plane that overlaps with the one end face or the other end face in a planar view and a fourth plane that is situated nearer the one electrode in relation to the third plane and a step is formed by the third plane and the fourth plane. A distance from a position at which the one end face or the other end face intersects with the third plane to an end, abutting on the fourth plane, of the third plane is equal to or less than 1 μm.

According to the present invention, it is possible to fabricate a liquid crystal display device including an organic insulation film having a contact hole tapered at a larger taper angle without increasing the amount of exposure.

BRIEF DESCRIPTION OF THE DRAWINGS

FIG. 4 is a cross-sectional view taken along line C-C' seen in FIG. 2;

FIG. 9 is a cross-sectional view taken along line F-F' seen in FIG. 7.

DETAILED DESCRIPTION OF PREFERRED EMBODIMENTS

In the following, embodiments in which the present invention is applied will now be described by means of drawings. In the following description, identical components are assigned the same labels (reference symbols) and their repeated description is omitted.

First Embodiment (Overall Structure)

Figure 1:
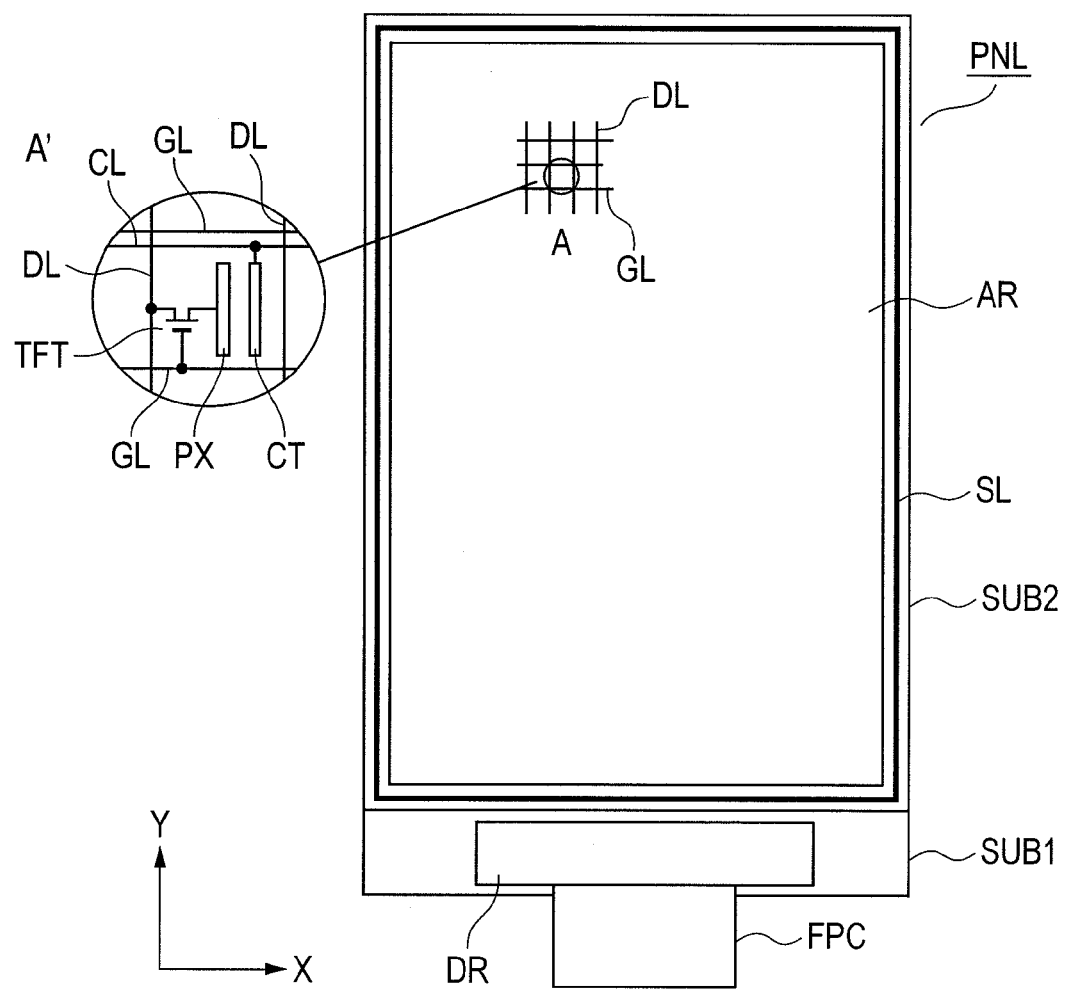
FIG. 1 is a diagram for explaining a rough structure of a liquid crystal display device of a first embodiment of the present invention.

FIG. 1 is a diagram for explaining a rough structure of a liquid crystal display device of a first embodiment of the present invention. Based on FIG. 1, an overall structure of the liquid crystal display device of the first embodiment will be described below. Note that X and Y marks seen in FIG. 1 indicate an X axis and a Y axis, respectively. The following description concerns a case where a linear pixel electrode is disposed nearer a liquid crystal layer in relation to a planar common electrode with an insulation film sandwiched between the pixel electrode and the common electrode. However, possible embodiments of the present invention are not limited to this case and are applicable to a case where, for example, a drain line and a planar pixel electrode are formed in the same layer and a linear common electrode is disposed nearer the liquid crystal layer in relation to the pixel electrode with an insulation film sandwiched between the common electrode and the pixel electrode. Moreover, possible embodiments of the present invention are applicable to not only an IPS type liquid crystal display device, as referred to herein, but also a so-called vertical alignment type liquid crystal display device such as a TN mode and a VA mode.

As shown in FIG. 1, the liquid crystal display device of the first embodiment has a liquid crystal display panel PNL that is configured with a first substrate SUB1 over which a pixel electrode (second electrode) PX and a thin-film transistor TFT are formed, a second substrate SUB2 which is disposed opposite to the first substrate SUB1 and over which, inter alia, color filters (coloring layers) are formed, and a liquid crystal layer, not shown, which is sandwiched between the first substrate SUB1 and the second substrate SUB2. By combining the liquid crystal display panel PNL with a backlight unit (backlight device) which is a light source of the liquid crystal display panel PNL, the liquid crystal display device is configured. The first and second substrates SUB1 and SUB 2 are fixed and liquid crystals are sealed in by a sealing material SL that is applied circularly around the periphery of the second substrate. Note that, in the liquid crystal display device of the first embodiment, involved in a liquid crystals sealed-in region, a display region AR is a region where display pixels (hereinafter simply referred to as pixels) are formed. Therefore, even within the liquid crystals sealed-in region, sections not having pixels formed therein and not engaged in display are not included in the display region AR.

The area of the second substrate SUB2 is smaller than the area of the first substrate SUB1, so that a bottom edge portion (as shown) of the first substrate SUB1 is exposed. In this edge portion of the first substrate SUB1, a drive circuit DR which is configured as a semiconductor chip is mounted. This drive circuit DR is to drive all pixels arranged in the display region AR. In the following description, the liquid crystal display panel PNL, even where it is referred to in a narrow sense, may sometimes be referred to as the liquid crystal display device.

As the first substrate SUB1 and the second substrate SUB2, for example, well-known glass substrates are generally used as a base material; however, the above substrates may be resinous transparent substrates.

In the liquid crystal display device of the first embodiment, over a surface, facing toward the liquid crystal layer, of the first substrate SUB1 and within the display region AR, scan signal lines (gate lines) GL are formed, extending in the X direction of FIG. 1 and evenly spaced and arranged in the Y direction. To theses gate lines, scan signals are supplied from the drive circuit DR. Also, visual signal lines (drain lines) DL are formed, extending in the Y direction of FIG. 1 and evenly spaced and arranged in the X direction. To these drain lines, visual signals (tone level signals) are supplied from the drive circuit. An area surrounded by two adjacent drain lines DL and two adjacent gate lines GL constitutes a pixel and a plurality of pixels are arranged in a matrix along the drain lines DL and gate lines GL within the display area AR.

Each pixel, for example, as shown in an equivalent circuit diagram A' enclosed by a circle A in FIG. 1, is provided with a thin-film transistor TFT which is turned on/off by a scan signal from a gate line GL, a pixel electrode PX to which a visual signal is supplied from a drain line DL via the turned on thin-film transistor TFT, and a common electrode CT to which a common signal having a basic, referential potential for a visual signal potential is supplied through a common line CL. Although the common electrode CT is schematically represented in a linear shape in the equivalent circuit diagram A' enclosed by a circle A in FIG. 1, the common electrode CT is formed in a planar shape as noted above in the first embodiment. Actually, the thin-film transistor TFT in the first embodiment behaves such that its drain electrode and source electrode switch over to each other depending on a bias applied to it. In the present specification, however, its electrode that is connected to the corresponding drain line DL is termed as a drain electrode DT and its electrode that is connected to the corresponding pixel electrode PX is termed as a source electrode ST for the sake of convenience.

An electric field having a component parallelized to the principal surface of the first substrate SUB1 is generated between the pixel electrode PX and the common electrode CT. By this electric filed, liquid crystal molecules are driven. Such a liquid crystal display device is known as the one capable of wide view angle display and called an IPS type or horizontal electric field type because of its specific characteristic of application of electric fields to liquid crystals. The thus configured liquid crystal display device performs display in a normally black display mode in which light transmissibility is minimum (black display) when no electric fields are applied to liquid crystals and then is made to rise by applying electric fields.

Ends of all drain lines DL and all gate lines GL extend beyond the sealing material SL and are connected to the drive circuit DR that generates drive signals such as visual signals and scan signals based on input signals which are input from an external system via a flexible printed-circuit board FPS. Note that, although the drive circuit DR is formed as a semiconductor chip and mounted on the first substrate SUB1 in the configuration of the liquid crystal display device of the first embodiment, an alternative configuration may be implemented as follows: either one of or both of a visual signal drive circuit that outputs visual signals and a scan signal drive circuit that outputs scan signals are mounted on the flexible printed-circuit board FPS by a tape carrier method or Chip On Film (COP) method and connected to the first substrate SUB1.

For the configuration shown by the equivalent circuit diagram A' enclosed by a circle A in FIG. 1, the common electrode CT is formed independently per pixel and a common signal is input to it through a common line CL. However, this is not restrictive in the liquid crystal display device of the first embodiment and an alternative configuration may be implemented, for example, such that the common electrode CT is formed all over at least the display area AR.

(Pixel Structure)

Figure 2:
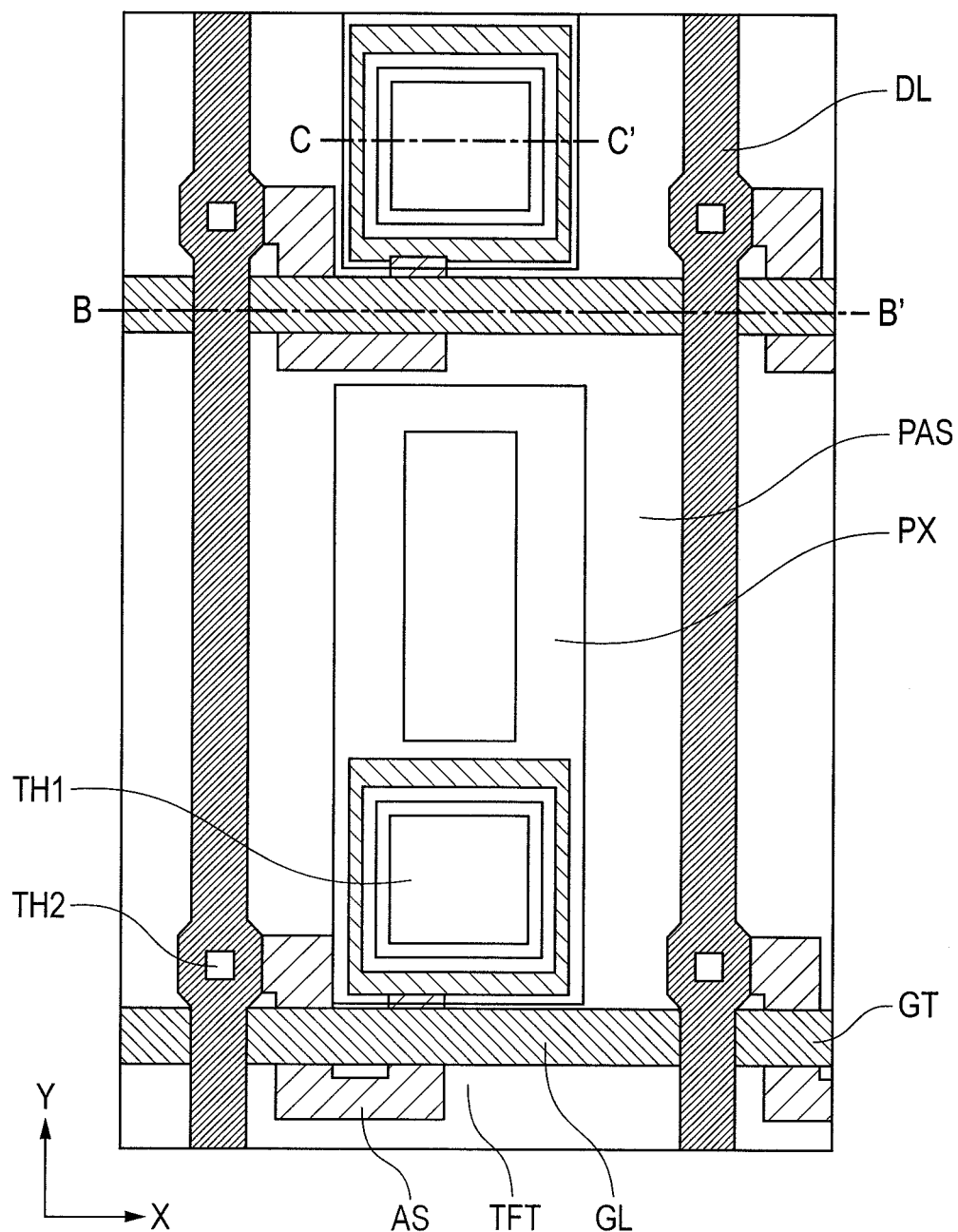
FIG. 2 is a top view for explaining a rough structure of a pixel in the liquid crystal display device of the first embodiment of the present invention.
Figure 3:
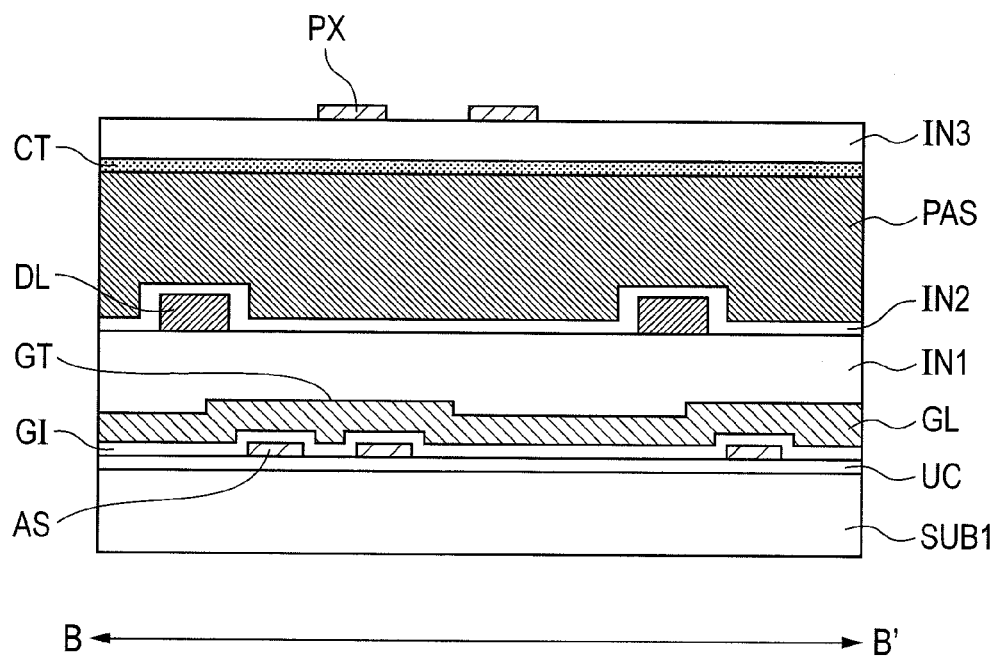
FIG. 3 is a cross-sectional view taken along line B-B' seen in FIG. 2.

FIG. 2 is a top view for explaining a rough structure of a pixel in the liquid crystal display device of the first embodiment of the present invention. FIG. 3 is a cross-sectional view taken along line B-B' seen in FIG. 2. FIG. 4 is a cross-sectional view taken along line C-C' seen in FIG. 2. A pixel structure in the liquid crystal display device of the first embodiment will be described below, based on FIGS. 2 through 4. Since other thin films except for an organic insulation film in which a contact hole is formed can be formed by any conventional photolithography technology, a detailed description of their forming method is omitted.

A transparent conductive film not shown which is made of a transparent conductive material such as Indium Tin Oxide (ITO) and becomes a common electrode is formed in an area surrounded by gate lines GL and drain lines DL, as shown in FIG. 2. The transparent conductive film is, for example, formed such that, in an edge portion that adjoins a common line, it lies above the common line and it is electrically connected to the common line through a contact hole. Note that, although ITO is used as the transparent conductive film in this case discussed here, conventional ZnO base transparent conductive films may be used, not limited to ITO.

Also, in the area surrounded by gate lines GL and drain lines DL, in a rectangular transparent film made of a transparent conductive material such as ITO, an opening is formed that is smaller than the transparent conductive film. This constitutes a linear (pectinate) pixel electrode PX in a region where it lies above the common electrode. One end of this pixel electrode is connected to a source electrode of a thin-film transistor TFT formed at an edge of the pixel through a contact hole TH1 whose side wall face is formed to slope at a slope angle or taper angle of about 60 degrees.

FIG. 3 shows a cross-sectional structure of a portion along a gate line GL. As shown in FIG. 3, on the surface of the first substrate SUB1, an undercoat film UC which is an insulation film is formed in order to block incursion of ions such as sodium (Na) and potassium (K) into the thin-film transistor TFT from the first substrate SUB1. As the undercoat film UC, for example, a thin film having a layered structure is used that is comprised of a layer made of silicon nitride (SiN) or the like first formed on the surface of the first substrate SUB1 and a layer made of silicon oxide (SiO) or the like overlying the first layer. However, the undercoat film is not limited to this.

In a layer overlying this undercoat film UC, a semiconductor layer AS made of, e.g., amorphous silicon is formed. This semiconductor layer AS is to become a semiconductor layer of the thin-film transistor TFT and may be made of polysilicon, microcrystalline silicon, etc.

In a layer overlying the semiconductor layer AS, a gate insulator film GI which is a silicon oxide (SiO) base thin film is formed so as to cover the semiconductor layer AS. This gate insulator film GI is to serve as a gate insulator film of the thin-film transistor TFT in a region where the thin-film transistor TFT is formed and its thickness or the like is set accordingly. In a layer overlying the gate insulator film GI, a gate line GL is formed and the gate line GL also serves as a gate electrode GT in a portion where it lies above the semiconductor layer AS. In a layer overlying this gate line GL, an inorganic insulation film (interlayer dielectric film) IN1 is formed. As the inorganic insulation film IN1, for example, silicon oxide (SiO) is preferable.

Further, in a layer overlying the inorganic insulation film IN1, a drain line DL extending in the Y direction of FIG. 2 is formed. The drain line DL also serves as a drain electrode in a portion where a part of the drain line DL is connected to the semiconductor layer AS through a contact hole TH2 formed in the gate insulator film GI and the inorganic insulation film IN1. A source electrode ST that is formed at the other end of the semiconductor layer AS, together with the drain line DL, is connected to the semiconductor layer AS through the contact hole TH1 formed in the gate insulator film GI and the inorganic insulation film IN1. In a region where a gate line GL and a drain line DL cross, the above-mentioned interlayer dielectric film IN1 is disposed between the gate line GL and the drain line DL, thus preventing a short circuit between the gate line GL and the drain line DL.

In a layer overlying the drain line DL and the source electrode ST, that is, overlying the thin-film transistor TFT, an inorganic insulation film IN2 is formed as a protective film made of an inorganic compound to cover the thin-film transistor TFT. This inorganic insulation film IN2 has a role of protecting the thin-film transistor TFT from, inter alia, some components of an organic insulation film PAS and is made of, for example, silicon nitride (SiN) film, silicon oxide (SiO, SiO2) film, or the like. The inorganic insulation film IN2 is formed all over the layer overlying the thin-film transistor TFT.

In a layer overlying the inorganic insulation film IN2, an organic insulation film PAS that serves as a planarizing film is formed. In the first embodiment, a taper angle of about 60 degrees is provided in a region where the contact hole TH1 is formed, as will be detailed later.

In a layer overlying the organic insulation film PAS, a transparent conductive film made of ITO is formed, which becomes the common electrode CT. In a further overlying layer, an inorganic insulation film IN3 that also servers as a capacitance insulating film is formed. Through the inorganic insulation film IN3, organic insulation film PAS, and inorganic insulation film IN2, the contact hole TH1 is formed extending to a thin film that becomes the source electrode ST. The contact hole TH1 provides electrical connection between the pixel electrode PX that is formed by a transparent conductive film made of ITO and the source electrode ST.

In a portion of the contact hole TH1 that is formed through the organic insulation film PAS, as shown in FIG. 4, a taper angle of about 60 degrees (denoted by θ in FIG. 4) is provided, which is the angle between the inorganic insulation film IN2 surface toward the liquid crystal layer and the sidewall of the organic insulation film PAS. Note that the taper angle is not limited to 60 degrees and may be any other angle larger than 60 degrees. In addition, as shown in FIG. 4, a step (a raised portion situated above the inorganic insulation film IN1 and the gate insulator film GI) is formed in a part of the inorganic insulation film IN2 surface toward the liquid crystal layer. In the through hole that forms the contact hole TH1, extending from the organic insulation film PAS surface toward the liquid crystal layer to the underlying inorganic insulation film IN2, the sidewall of the organic insulation film PAS is formed near the above step (raised portion) of the inorganic insulation film IN2, as will be detailed in a later subsection "Principle" subsection.

More specifically, in the first embodiment, in the region where the contact hole TH1 is formed, the sidewall of the organic insulation film PAS is formed such that a distance L between a lower side corner of the organic insulation film PAS, which is denoted by a circle D and adjoins the inorganic insulation film IN2 formed in the underlying layer, and an end (toward the sidewall of the organic insulation film PAS) of the step (raised portion) formed in a part of the inorganic insulation film IN2 surface toward the liquid crystal layer is equal to or less than 1 μm. In other words, the lower side corner of the organic insulation film PAS is positioned within the distance of 1 μm from the lower end of the step (raised portion) formed in a part of the inorganic insulation film IN2 surface toward the liquid crystal layer. Owing to the above-described configuration according to the first embodiment, a large slope angle of the organic insulation film PAS is provided without significantly increasing the amount of exposure when the organic insulation film PAS is exposed to light. For the exposure, for example, GHI rays are used. Because the amount of exposure increases in proportion to exposure time, it is possible to provide a large slope angle of the organic insulation film PAS without decreasing the production throughput of the liquid crystal display device. Therefore, it is possible to reduce the area occupied by the contact hole in a pixel region and improve the aperture ratio without decreasing the production throughput of the liquid crystal display device.

The step (raised portion) that is formed in a part of the inorganic insulation film IN2 is the step formed by layering the inorganic insulation film IN2 over the end portions of the gate insulator film GI and the inorganic insulation film IN1 which are formed in the layers overlying the semiconductor layer AS. In order to form such step, according to the first embodiment, the opening of the organic insulation film PAS is formed to have a larger width than the width of the opening that is formed in the inorganic insulation film IN2, and the opening of the gate insulator film GI and the inorganic insulation film IN1 is formed to have a larger width than the width of the opening of the organic insulation film PAS. Thereby, an end portion of the pixel electrode PX is formed over the surface of the thin film that becomes the source electrode ST of the thin-film transistor TFT and the source electrode ST and the pixel electrode PX are electrically connected.

(Principle)

Figure 5A:
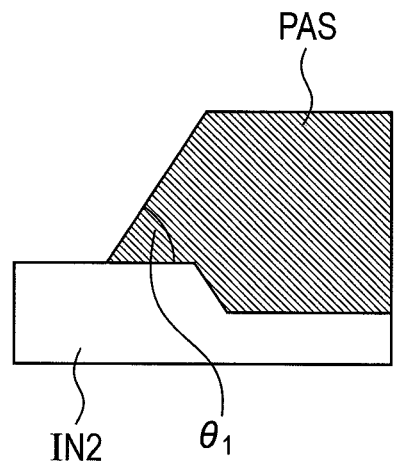
FIGS. 5A to 5C are cross-sectional views for explaining the principle of the present invention.
Figure 5B:
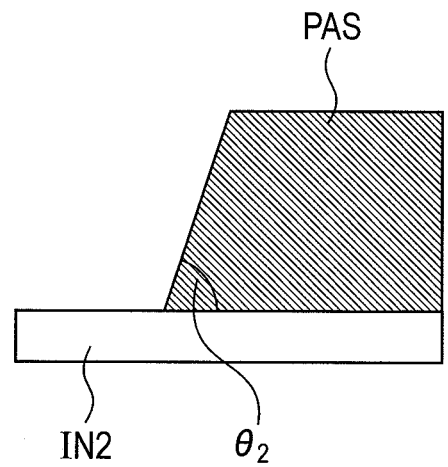
Figure 5C:
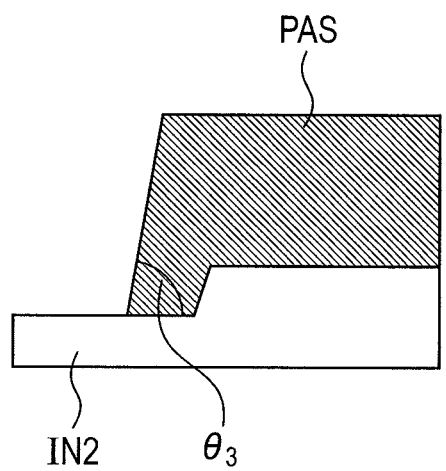

FIGS. 5A to 5C are cross-sectional views for explaining the principle of the present invention. FIG. 5A is a cross-sectional view when the lower corner of the organic insulation film PAS is formed over a higher plane of the step. FIG. 5B is a cross-sectional view when the lower corner of the organic insulation film PAS is formed over a planar upper surface. FIG. 5C is a cross-sectional view when the lower corner of the organic insulation film PAS is formed over a lower plane of the step. Note that FIGS. 5A to 5C show the cases where the openings of the organic insulation films are formed with the same amount of exposure.

The present inventors have formed respective organic insulation films PAS over a planar inorganic insulation film IN2 and over inorganic insulation films IN2 with the step formed and then formed respective openings having tapered sidewalls in the organic insulation films PAS using an amount of exposure. Then, the inventors have compared taper angles in the respective cases and obtained the following finding.

A taper angle of the organic insulation film PAS when the organic insulation film PAS is formed over the higher plane (flat plane) of the step in the inorganic insulation film IN2, thus covering the step, is denoted by θ1, as shown in FIG. 5A. A taper angle of the organic insulation film PAS when the organic insulation film PAS is formed over the upper surface and (flat of a planar inorganic insulation film IN2 is denoted by θ2, as shown in FIG. 5B. And a taper angle of the organic insulation film PAS when the organic insulation film PAS is formed over he lower plane (flat plane) of the step in the inorganic insulation film IN2, thus covering the step, is denoted by θ3, as shown in FIG. 5C. The distance between the sidewall of the organic insulation film PAS and the step is equal to or less than 1 μm.

The taper angles of the openings, i.e., the corners of the organic insulation films PAS, formed in the above cases, are as follows: θ3>θ2>θ1. In order to form the corner with a larger taper angle θ3 relative to the taper angle θ2 with respect to the planar underlying film, it has been found that the larger taper angle θ3 can be obtained even using the same amount of exposure by forming the organic insulation film PAS over the lower plane of the step of the inorganic insulation film IN2, thus covering the step, as shown in FIG. 5C. In order to form the corner with a smaller taper angle θ1 than the taper angle θ2 with respect to the planar underlying film using the same amount of exposure, it has been found that the smaller taper angle θ1 can be obtained even using the same amount of exposure by forming the organic insulation film PAS over the he higher plane of the step of the inorganic insulation film IN2, thus covering the step, as shown in FIG. 5A.

Figure 6:
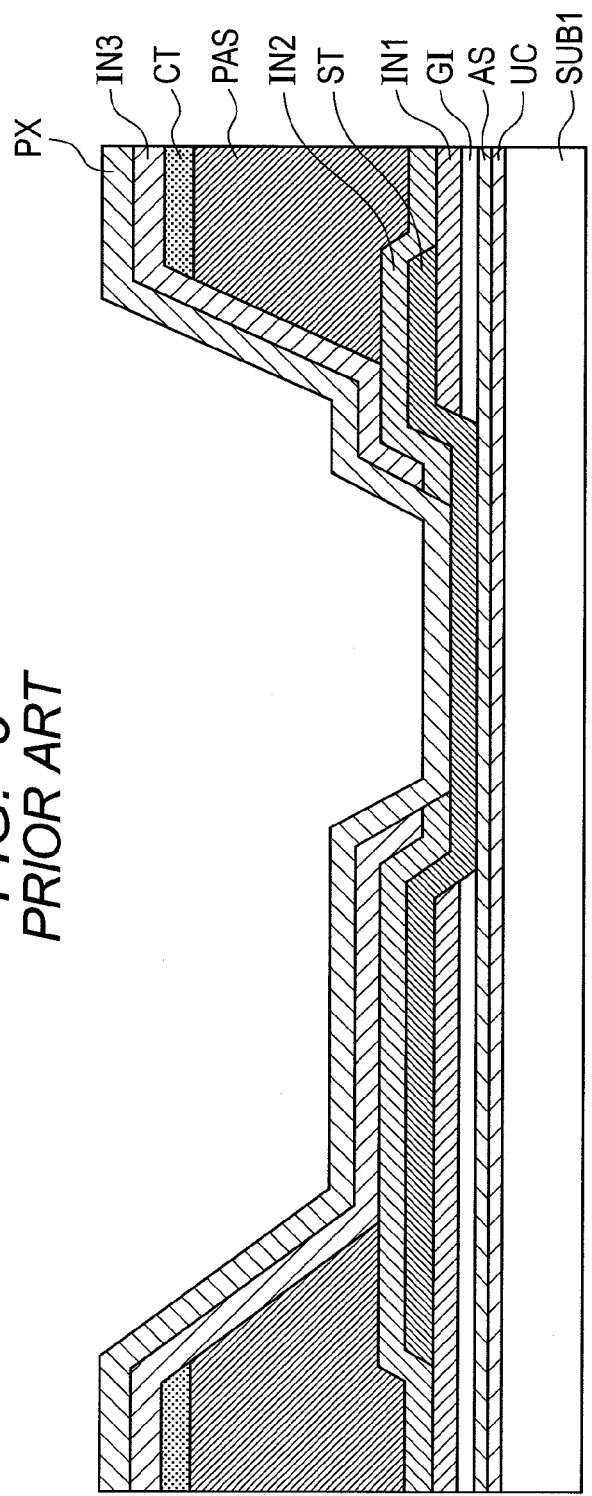
FIG. 6 is a cross-sectional view of a contact hole portion in a conventional liquid crystal display device corresponding to FIG. 4.

Thus, in the liquid crystal display device of the first embodiment, the lower corner of the organic insulation film PAS is formed over the lower plane of the stage of the inorganic insulation film IN2 and the stage is covered with the organic insulation film PAS. By this configuration, the sidewall of the organic insulation film PAS, i.e., the sidewall of the contact hole TH1 is formed to have a taper angle of about 60 degrees, as shown in FIG. 4, without increasing the amount of exposure when forming the organic insulation film PAS. Thereby, the taper angle of the sidewall of the contact hole TH1 in the liquid crystal display device of the first embodiment shown in FIG. 4 can be made larger than the taper angle of the contact hole sidewall of a conventional liquid crystal display device (the shape of the step of the inorganic insulation film IN2 differs from the step shown in FIG. 4) which is shown in FIG. 6 corresponding to FIG. 4. However, the pixel structure in the conventional liquid crystal display device shown in FIG. 6 is such that the organic insulation film PAS is formed over the higher plane of the stage of the inorganic insulation film IN2, thus covering the step; that is, this is very similar to the configuration as shown in FIG. 5A. Hence it can be supposed that quite a large amount of exposure is needed to form the organic insulation film PAS having a taper angle of θ=60 degrees or larger in the conventional liquid crystal display device including such configuration.

Second Embodiment

Figure 7:
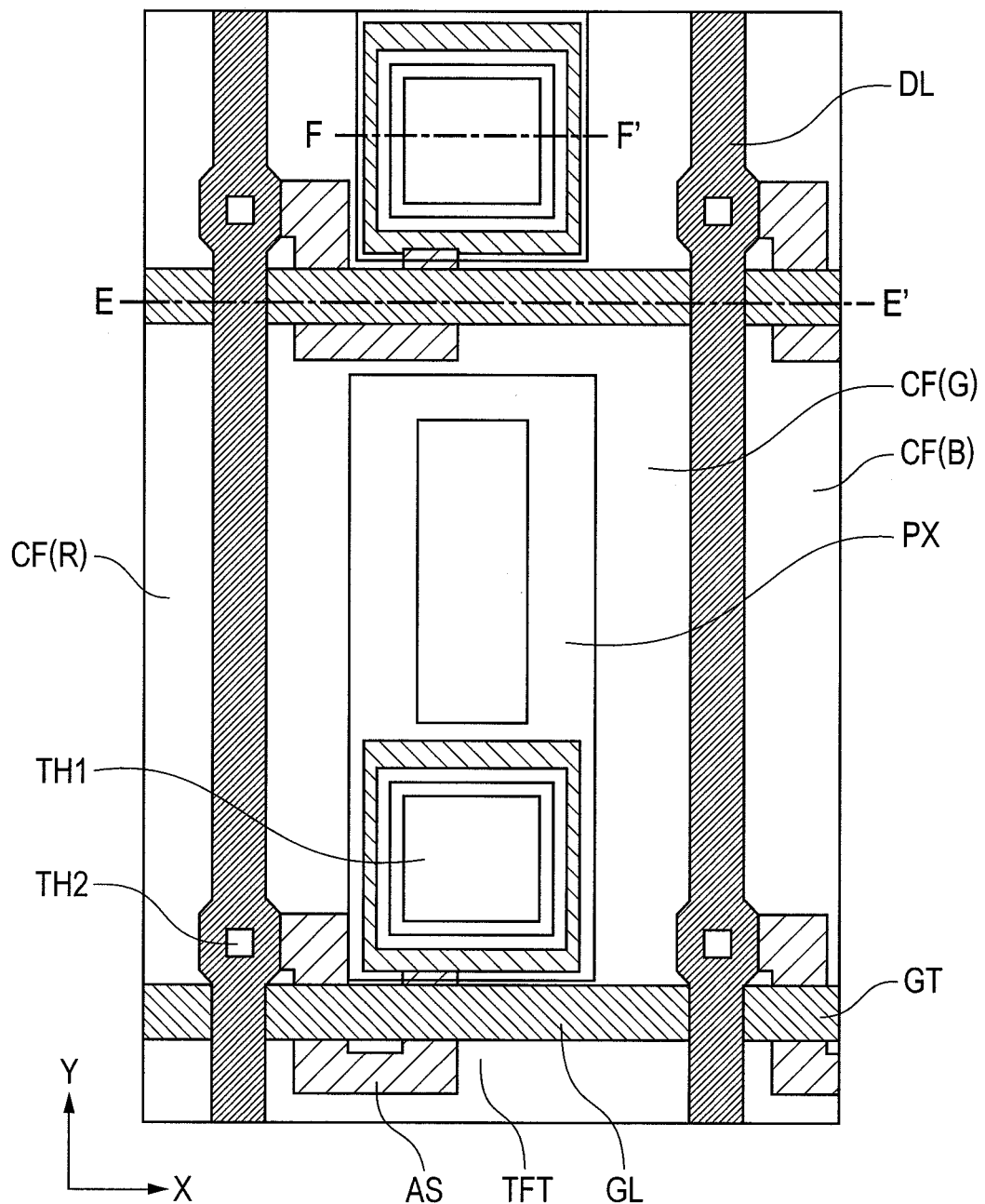
FIG. 7 is a top view for explaining a rough structure of a pixel in a liquid crystal display device of a second embodiment of the present invention.
Figure 8:
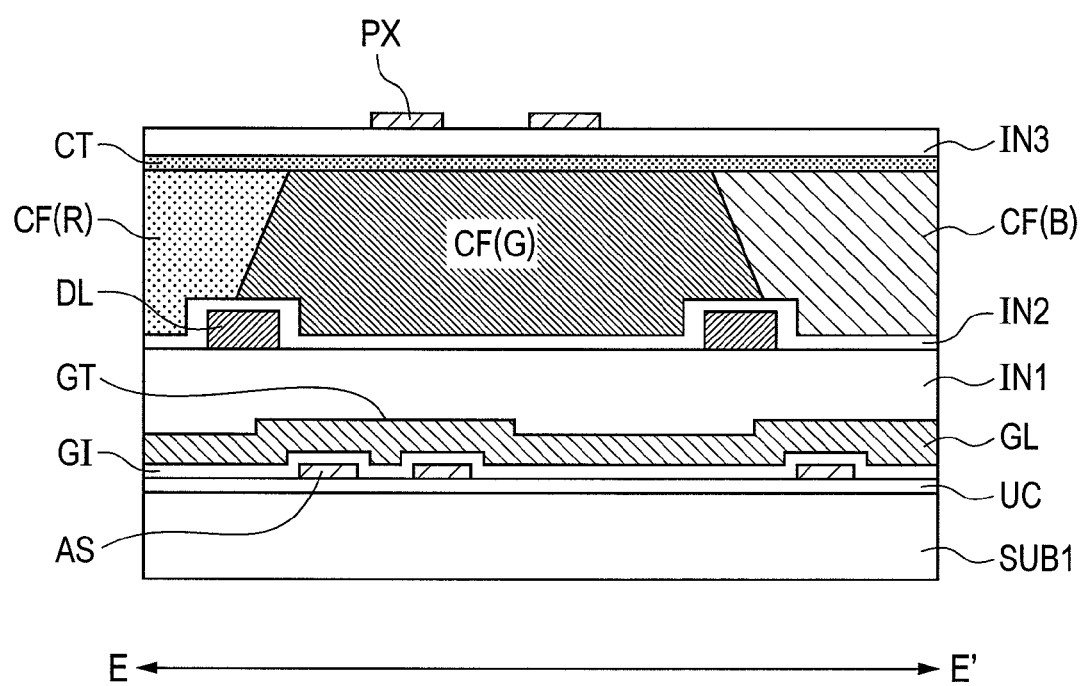
FIG. 8 is a cross-sectional view taken along line E-E' seen in FIG. 7.

FIG. 7 is a top view for explaining a rough structure of a pixel in a liquid crystal display device of a second embodiment of the present invention. FIG. 8 is a cross-sectional view taken along line E-E' seen in FIG. 7. FIG. 9 is a cross-sectional view taken along line F-F' seen in FIG. 7. The liquid crystal display device of the second embodiment is configured such that red (R), green (G), and blue (B) color filters (coloring layers) are formed in order in the region where the organic insulation film PAS is formed in the liquid crystal display device of the first embodiment. Other components except for the color filters are the same as for the first embodiment. Thus, in the following description, how the color filters are configured and a contact hole TH1 that is formed through the color filters are described in detail.

As shown in FIG. 7, over a surface (face, upper surface), facing toward the liquid crystal layer, of the first substrate SUB in the liquid crystal display device of the second embodiment, gate lines GL and drain line DL are arranged at predetermined intervals. In a pixel defined by an area surrounded by two adjacent drain lines DL and two adjacent gate lines GL, color filters of any color of red (R), green (G), and blue (B) are formed. Particularly, in the liquid crystal display device of the second embodiment, each color filter is formed in a strip shape along the Y direction in which the drain lines DL extend. For example, a green (G) color filer CF(G) is formed in a pixel in the center of FIG. 7 and a green (G) color filer CF(G) is also formed in each of pixels adjacent to the center pixel in the Y direction. On the other hand, in the X direction, strip-shaped color filters (a red (R) color filter CF(R) (left in FIG. 7), a green (G) color filter CF(G) (center in FIG. 7), and a blue (B) color filter CF(B) (right in FIG. 7)) are formed adjacently. Moreover, in the liquid crystal display device of the second embodiment, ends (adjoining ends) of adjacently arranged color filters are tapered and disposed to overlap with each other and this overlap portion lies above each drain line DL.

In the thus configured pixel of the second embodiment, as shown in FIG. 8, thin films including an inorganic insulation film IN2 are configured in the same manner as for the first embodiment and the color filters CF(R), CF(R), CF(R) are formed over the inorganic insulation film IN2. This inorganic insulation film IN2 has a role of protecting the thin-film transistor TFT from, inter alia, metal components included in pigments which are organic insulative substances of the color filters. In the second embodiment, each red (R) color filter CF(R), green (G) color filter CF(G), and blue (B) color filter CF(B) are formed in order in a layer overlying the inorganic insulation film IN2. Note that the order in which the color filters of each color are formed is not limited to the above-mentioned order. In forming these color filters, a region where two adjacent color filters lie above each drain line DL and overlap with each other is used as a light shielding region (light shielding film). That is, two adjacent color filters are configured to overlap with each other above the relevant drain line DL.

In a case where such an overlap configuration is adopted, if the taper angle of a lower positioned color filter in the overlap portion (the taper angle of CF(G) in FIG. 8) is somewhat large, an upper positioned color filter is usually superposed over the lower positioned color filter and a raised portion is formed in the overlap portion. In a left overlap portion in FIG. 8, a color filter CF(R) is superposed over the color filter CF(G) and a raised portion is formed. Similarly, in a right overlap portion in FIG. 8, a color filter CF(B) is superposed over the color filter CF(G) and a raised portion is formed. This raised portion results in raised and recessed portions in the common electrode CT and pixel electrode PX that are formed in a layer overlying the color filters, which causes a degradation in the image quality of the liquid crystal display device. Therefore, the taper angles of the color filters in the overlap portions shown in FIG. 8 should be made a relatively small angle.

On the other hand, when forming color filters CF(R), CF(G), and CF(B), a contact hole TH1 in each pixel region is also to be formed in order. For example, to form a color filter CF(G), after applying a resist material for green (G) all over the surface of the first substrate SUB1, the resist is patterned into a predetermined shape by photolithography. In this process, the ends (overlap portions) of the color filters are tapered and contact holes are formed concurrently. However, because a predetermined amount of irradiation of exposure light onto the glass substrate is equally performed for a region where a contact hole TH1 is formed and a color filter overlap portion, the taper angle of the overlap portion becomes equal to the taper angle of the contact hole TH1 in conventional techniques. This makes it difficult to form respective films with different optimal taper angles in each of these regions. It is possible to realize different amounts of exposure by using, for example, a halftone mask or the like. However, even in this case, exposure should be performed by an amount of exposure that is determined by the taper angle of the contact hole TH1 for which a large amount of exposure should be performed. Thus, the exposure time becomes lengthy and the production throughput decreases.

To address this, in the liquid crystal display device of the second embodiment, as shown in FIG. 8, color filters in an each overlap portion, lying above each drain line DL, are formed such that, for example, the lower corners of the color filters are positioned on the upper plane of a step that is formed by each drain line DL and the color filters cover the step (configuration shown in FIG. 5A). Thereby, the corners of the color filters are tapered at a relatively small taper angle. For example, the color filter CF(G) is configured as follows: in upper peripheries of a raised portion of the inorganic insulation film IN2 which is formed under the color filter CF(G), a corner is formed where the color filter CF(G) and the inorganic insulation film IN2 come into contact and the upper surface (toward the liquid crystal layer) of the color filter CF(G) is formed to extend above the lower plane between raised portions. The distance between the tapered color filter corner and the relevant end edge of the raised portion is equal to or less than 1 µm. This is because the effect described in conjunction with FIGS. 5A to 5C is obtained more significantly.

Furthermore, in a portion where the contact hole TH1 is formed, as shown in FIG. 9, the sidewall of the color filter CF(G) is formed such that a distance L between a lower side corner of the color filter CF(G) contacting with the inorganic insulation film IN2 that is formed in the underlying layer and an end which is near the first substrate SUB1 of a step that is formed in the inorganic insulation film IN2 surface toward the liquid crystal layer is equal to or less than 1 µm. That is, the lower side corner of the color filter CF(G) is positioned within the distance L=1 µm or less from the relevant lower end of the raised portion that is formed in the inorganic insulation film IN2 surface toward the liquid crystal layer (configuration shown in FIG. 5C). Thus, the same effect as in the first embodiment can be obtained. In addition, in upper peripheries of the raised portion of the inorganic insulation film IN2 which is formed under the color filter CF, a corner is formed where the color filter CF and the inorganic insulation film IN2 come into contact and the upper surface (toward the liquid crystal layer) of the color filter CF is formed to extend above the lower plane from the raised portion. Thus, the taper angle of the color filter CF can be made larger with the same amount of exposure.

In this way, in the liquid crystal display device of the second embodiment, even if there are regions such as the contact hole TH1 portion and the color filter overlap portion for which optimal taper angles differ, respective optimal taper angles can be provided only by adjusting positions where a step of the inorganic insulation film IN2 and a corner of a tapered sidewall should be formed, without increasing the number of times of exposure and without increasing the amount of exposure.

While the invention made by the present inventors has been described specifically based on the foregoing embodiments of the invention, the present invention is not limited to the described embodiments and various modifications may be made thereto without departing from the scope of the invention.

What is claimed is:

1. A liquid crystal display device comprising a first substrate and a second substrate which is disposed to be opposed to the first substrate across a liquid crystal layer, the first substrate including drain lines extending in a first direction and arranged in a second direction; gate lines extending in the second direction and arranged in the first direction; thin-film transistors that output visual signals from the drain lines to pixel electrodes in sync with scan signals from the gate lines; and an organic film that is formed between each of the thin-film transistors and each of the pixel electrodes,
    wherein the organic film has a contact hole for electrical connection between a source electrode of the each thin-film transistor and the each pixel electrode,
    wherein a layer underlying the organic film includes a lowermost plane and an uppermost plane extending substantially in parallel to a plane of the first substrate, the uppermost plane being farther from the first substrate than the lowermost plane, and a single step extending between the uppermost plane and the lowermost plane,
    wherein the organic film has an edge portion which forms the contact hole, and the edge portion has an end portion which is in contact with the layer underlying the organic film,
    wherein the end portion of the organic film lies on the lowermost plane of the layer underlying the organic film, and
    wherein a sidewall part of the contact hole which is formed in the organic film is formed to have a taper angle of 60 degrees or larger.

2. The liquid crystal display device according to claim 1, wherein the organic film is formed in a layer overlying the single step, thus covering the single step.

3. The liquid crystal display device according to claim 1, wherein the organic film includes an organic insulation film that is formed in a layer overlying an inorganic insulation layer as the layer underlying the organic insulation film.

4. The liquid crystal display device according to claim 3, wherein the single step is the single step of the inorganic insulation film.

5. The liquid crystal display device according to claim 3, wherein the single step is formed by a difference in the number of thin film layers that are formed under the inorganic insulation film.

6. The liquid crystal display device according to claim 1, the organic film includes red (R), green (G), and blue (B) coloring layers that are formed in a layer overlying an inorganic insulation film as the layer underlying the organic film.

7. The liquid crystal display device according to claim 6,
    wherein the coloring layers are formed such that their adjoining end faces are tapered and the adjoining end faces of two of the red (R), green (G), and blue (B) coloring layers overlap with each other, and
    wherein a region where the adjoining end faces of the two coloring layers overlap with each other is situated in a layer overlying the each drain line and lies above the each drain line.

8. A liquid crystal display device comprising a plurality of pixels, each including a thin-film transistor and a pixel electrode formed above a substrate, and an organic insulation film formed between one electrode of the thin-film transistor and the pixel electrode,
    wherein the one electrode and the pixel electrode are connected through a contact hole formed in the organic insulation film,
    wherein a sidewall of the contact hole, which is made of the organic insulation film, is tapered,
    wherein an underlying layer beneath the organic insulation film, in contact with the organic insulation film, includes a first lowermost plane extending substantially in parallel to a plane of the substrate that overlaps with the sidewall in a planar view and a second uppermost plane extending substantially in parallel to the plane of the substrate that is farther from the substrate than the first lowermost plane and is disposed at a side of the first lowermost plane, the side of the first lowermost plane being disposed at a position spaced from the sidewall, wherein a single step of the underlying layer is formed so as to extend between the first lowermost plane and the second uppermost plane, and wherein a distance from a position at which the sidewall of the organic insulation film of the contact hole intersects with the first lowermost plane to an end of the first lowermost plane abutting the single step formed so as to extend between the first lowermost plane and the second uppermost plane is equal to or less than 1 μm.

9. The liquid crystal display device according to claim 8, wherein the underlying layer is an inorganic insulation film including silicon nitride or silicon oxide.

10. The liquid crystal display device according to claim 8, wherein the thin-film transistor has a gate insulator film, and wherein an end of the gate insulator film is situated under the second uppermost plane.

11. A liquid crystal display device comprising:

a pair of substrates that is disposed to be opposed to each other;

a plurality of pixels, each including a thin-film transistor and a pixel electrode, formed over one of the pair of substrates;

a color filter layer including a first color filter, a second color filter, and a third color filter formed between the thin-film transistor and the pixel electrode and formed adjacent to each other, wherein one electrode of the thin-film transistor and the pixel electrode are connected through a contact hole formed in the color filter layer, wherein a sidewall of the contact hole, which is made of the color filter layer, is tapered, wherein an underlying layer beneath the color filter layer, in contact with the color filter layer, includes a first plane extending substantially in parallel to a plane of the one of the pair of substrates that overlaps with the sidewall in a planar view and a second plane extending substantially in parallel to the plane of the one of the substrates that is nearer to the pixel electrode than the first plane and is disposed at a first side of the first plane, which is spaced from the sidewall, wherein a first step is formed so as to extend between the first plane and the second plane, wherein a distance from a position at which the sidewall of the color filter layer of the contact hole intersects with the first plane to an end of the first plane abutting the step formed so as to extend between the first plane and the second plane is equal to or less than 1 μm, wherein the first color filter, the second color filter, and the third color filter are formed such that an end face of the second color filter is superposed over one end face of the first color filter and an end face of the third color filter is superposed over the other end face, which is different from the one end face, of the first color filter, wherein the one end face and the other end face of the first color filter are tapered, wherein a region of the underlying layer, in contact with the first color filter, includes a third plane extending substantially in parallel to the plane of the one of the pair of substrates that overlaps with the one end face or the other end face in a planar view and a fourth plane extending substantially in parallel to the plane of the one of the pair of substrates that is nearer to the pixel electrode than the third plane and is disposed at a second side of the third plane, the second side being opposite to the one end face or the other end face, wherein another step is formed so as to extend between the third plane and the fourth plane, and wherein a distance from a position at which the one end face or the other end face intersects with the third plane to an end of the third plane abutting the step formed so as to extend between the third plane and the fourth plane is equal to or less than 1 μm.

12. The liquid crystal display device according to claim 11, wherein the underlying layer is an inorganic insulation film including silicon nitride or silicon oxide.

13. The liquid crystal display device according to claim 11, wherein the thin-film transistor has a gate insulator film, and wherein an end of the gate insulator film is situated under the second plane.

14. The liquid crystal display device according to claim 11, wherein one of the substrates includes a plurality of drain lines that supply visual signals to the pixel electrode via the thin-film transistor, and wherein each of the drain lines is situated under the third plane.

* * * * *